(12) United States Patent
Lee et al.

(10) Patent No.: US 7,406,778 B2
(45) Date of Patent: Aug. 5, 2008

(54) MEASURING TAPE AND MEASURING TAPE END PIECE

(75) Inventors: Barry Howard Lee, Leigh on Sea (GB); John Richard Fisher, London (GB)

(73) Assignee: Fisco Tools Limited, Rayleigh, Essex (GB)

( * ) Notice: Subject to any disclaimer, the term of this patent is extended or adjusted under 35 U.S.C. 154(b) by 0 days.

(21) Appl. No.: 10/541,940

(22) PCT Filed: Jan. 13, 2003

(86) PCT No.: PCT/GB03/00113

§ 371 (c)(1),
(2), (4) Date: May 15, 2006

(87) PCT Pub. No.: WO2004/063659

PCT Pub. Date: Jul. 29, 2004

(65) Prior Publication Data

US 2006/0248741 A1    Nov. 9, 2006

(51) Int. Cl.
*G01B 3/10* (2006.01)
(52) U.S. Cl. .............................. 33/758; 33/755; 33/768
(58) Field of Classification Search ................... 33/755, 33/758, 768
See application file for complete search history.

(56) References Cited

U.S. PATENT DOCUMENTS

| | | |
|---|---|---|
| 1,172,463 A | 2/1916 | Johnson |
| 1,434,528 A | 11/1922 | Crogan |
| 1,542,990 A | 6/1925 | Di Tomasso |
| 2,466,405 A | 4/1949 | Fowler |
| 2,711,030 A | 6/1955 | Drew et al. |
| 2,893,656 A | 7/1959 | Carlson |
| 4,147,443 A | 4/1979 | Skobel |
| 4,384,757 A | 5/1983 | Andrews, Jr. et al. |
| 4,827,622 A | 5/1989 | Makar |
| 4,890,393 A * | 1/1990 | St. Jean ..................... 33/768 |
| 4,930,227 A | 6/1990 | Ketchpel |
| 5,010,657 A | 4/1991 | Knapp |
| 5,077,911 A | 1/1992 | von Wedemeyer |
| D330,458 S | 10/1992 | Curtis et al. |
| 5,210,956 A | 5/1993 | Knispel et al. |
| 5,213,749 A | 5/1993 | Huss et al. |
| 5,303,937 A | 4/1994 | Huss et al. |

(Continued)

FOREIGN PATENT DOCUMENTS

AU    20032503    11/2000

(Continued)

OTHER PUBLICATIONS

First Measure Ind.. co., Ltd & S Mark Taiwan IND. Co., Ltd.; advertising circular dated Oct. 10, 2002.

*Primary Examiner*—Yaritza Guadalupe-McCall
(74) *Attorney, Agent, or Firm*—Buchanan Ingersoll & Rooney PC

(57) ABSTRACT

A measuring tape end piece (10) is disclosed having a support portion (28) and a grip portion (32). The grip portion is moulded onto the support portion. The support portion provides a keying interface on which the support portion is moulded. The keying interface includes at least one concave formation such as a hole or channel to allow the grip portion to be firmly secured to the support portion.

14 Claims, 8 Drawing Sheets

U.S. PATENT DOCUMENTS

| | | | |
|---|---|---|---|
| 5,402,583 A | 4/1995 | Komura | |
| 5,600,894 A | 2/1997 | Blackman et al. | |
| 5,659,970 A | 8/1997 | Reedy | |
| 5,699,623 A | 12/1997 | Lee | |
| 5,769,138 A | 6/1998 | Sadowski et al. | |
| 5,845,412 A | 12/1998 | Arcand | |
| 5,848,733 A | 12/1998 | Foster et al. | |
| 5,890,634 A | 4/1999 | Zuckerman et al. | |
| 5,894,677 A | 4/1999 | Hoffman | |
| 6,032,379 A | 3/2000 | Usami | |
| 6,032,896 A | 3/2000 | Liu | |
| D424,393 S | 5/2000 | Lamond et al. | |
| 6,070,338 A | 6/2000 | Garity | |
| 6,108,926 A | 8/2000 | Fraser et al. | |
| 6,115,931 A | 9/2000 | Arcand | |
| 6,216,306 B1 | 4/2001 | Esterson et al. | |
| 6,226,886 B1 | 5/2001 | Lamond et al. | |
| 6,235,008 B1 | 5/2001 | Heinzelman et al. | |
| 6,257,229 B1 | 7/2001 | Stewart et al. | |
| D451,832 S | 12/2001 | Lamond et al. | |
| 6,328,083 B1 | 12/2001 | Esterson et al. | |
| 6,363,817 B1 | 4/2002 | Lamond et al. | |
| 6,370,790 B1 | 4/2002 | Stenger | |
| D457,450 S | 5/2002 | Lamond et al. | |
| 6,405,619 B1 | 6/2002 | Lamond et al. | |
| 6,418,820 B1 | 7/2002 | Lamond et al. | |
| 6,442,863 B1 | 9/2002 | Poineau et al. | |
| 6,491,248 B1 | 12/2002 | Liu | |
| 6,568,099 B2 | 5/2003 | Bergeron | |
| 6,839,981 B2 * | 1/2005 | Rafter | 33/770 |
| 6,874,245 B2 * | 4/2005 | Liu | 33/758 |
| 2001/0042315 A1 | 11/2001 | Dixon | |
| 2002/0011008 A1 | 1/2002 | Nelson et al. | |
| 2002/0073570 A1 | 6/2002 | Conder | |
| 2002/0184783 A1 | 12/2002 | Poineau et al. | |
| 2003/0009899 A1 | 1/2003 | Ha | |
| 2003/0019122 A1 | 1/2003 | Lin | |
| 2003/0019123 A1 | 1/2003 | Lin | |
| 2003/0093913 A1 | 5/2003 | Odachowski | |
| 2003/0093914 A1 | 5/2003 | Croya et al. | |
| 2003/0136017 A1 | 7/2003 | Balota | |
| 2003/0154617 A1 | 8/2003 | Ricalde | |
| 2003/0226274 A1 * | 12/2003 | Lin | 33/758 |
| 2004/0211080 A1 * | 10/2004 | Lin | 33/758 |

FOREIGN PATENT DOCUMENTS

| | | |
|---|---|---|
| CA | 2308240 | 11/2000 |
| DE | 3141635 | 4/1983 |
| DE | 0442051 | 11/1990 |
| EP | 1050737 | 11/2000 |
| GB | 437381 | 10/1935 |
| GB | 946749 | 1/1964 |
| GB | 2297031 | 7/1996 |
| GB | 2343370 | 5/2000 |
| JP | 6-147802 | 5/1994 |
| JP | 2003121103 | 4/2003 |

* cited by examiner

MEASURING TAPE AND MEASURING TAPE END PIECE

The present invention relates to an end piece for a measuring tape.

Measuring tapes are known which are in the form of a measuring blade which is spoolable within a casing. The measuring blade can be extended from the casing by drawing its free end from an opening in the casing. The blade is usually metallic with measurement graduations printed on one surface. Typically, when extended from the casing, the blade is transversely curved. This provides some longitudinal stiffness to the blade, enabling a relatively long section of blade to be extended from the casing without other support. Usually, a spring within the casing urges the blade from its extended configuration back towards the spooled configuration.

The free end of the blade is provided with an end hook. During use, for example when the measure is being used to measure a distance along a surface, the end hook is used to engage an edge or corner of the surface in order to retain the blade in the extended configuration against the urging of the spring. Alternatively, the end hook may be abutted against a surface in order to measure a distance extending away from the surface.

The end hook is usually a projection such as a tongue, extending approximately perpendicularly from the blade. The end hook usually has substantially flat forward and rearward faces lying approximately perpendicularly to the longitudinal direction of the extended blade.

The end hook may form part of an end piece which is longitudinally moveable with respect to the blade, between two stop points. Usually, these stop points are separated by a distance substantially equal to the thickness of the end hook, i.e. the distance between the forward and rearward faces of the end hook. This limited movement of the end piece accounts for the measurement being taken up to the rearward face of the end hook (e.g. when the rearward face is used to engage with an edge or corner) or up to the forward face of the end hook (e.g. when the forward face is used to abut against a surface to be measured from).

A problem with many known measures is the tendency of the end hook to slip, particularly when the rearward face of the end hook is used to retain the free end of the blade at an edge or corner. This tendency is even more pronounced when there is a component of force acting on the end hook urging it to slide with respect to the edge, corner or surface at which the end hook is located.

This problem has been addressed in U.S. Pat. No. 5,210,956 by providing an abrasive high friction surface at the rearward face of the end hook. The abrasive is provided on an adhesive-backed film, allowing adhesion to the end hook. A similar solution is proposed in U.S. Pat. No. 5,077,911 where the rearward face of the end hook is coated with friction bodies such as sapphire crystals having a grain size of about 0.12 mm.

However, the use of abrasive surfaces brings its own problems. In particular, such abrasives can scratch and damage surfaces which are being measured by the blade. Furthermore, they can wear away to leave little or no grip between the end hook and the surface to be measured.

An alternative solution has been proposed in JP-A-06-147802. In this document, a rubber film is applied to the rearward and/or forward faces of an end hook by an adhesive. However, this has the disadvantage that the rubber film is held with respect to the end hook only by the adhesive which may wear out or which may not withstand repeated use of the measure.

Accordingly, in a general aspect, the present invention provides a moulded grip portion on the end hook.

The inventors have found that a moulded grip portion can have an improved mechanical connection to a support portion of the end hook in comparison, for example, to an adhesive. Furthermore, the moulding can provide a more efficient method of forming the grip on the end hook. Also, the moulding can allow a complex shape to be formed with high tolerance.

Preferably, in one aspect, the present invention provides an end piece for attachment to a free end of a measuring tape, the end piece including an end hook with a support portion formed of a first material and a grip portion formed of a second material, wherein the support portion provides a keying interface on which the grip portion is moulded, thereby securing the grip portion to the support portion.

Additionally or alternatively, the grip portion may be secured to the support portion by a chemical bond. The chemical bond may be provided by selecting or modifying the material of the support portion and/or the grip material to achieve a chemical bond between them.

In a second aspect, the invention provides a measuring tape with a free end and an end piece according to the first aspect attached to the free end.

The keying interface preferably includes at least one (and preferably more) concave formation on the support portion. For example, the keying interface may include a concave step or steps, dent or dents, dimple or dimples, etc. Such a concave formation is preferably located on the rearward side of the support portion, but may alternatively or additionally be located on the forward side of the support portion.

Most preferably, the keying interface includes at least one channel formed in the support portion. The channel may extend from the rearward side to the forward side of the support portion. In particular, the channel may be a hole formed in the support portion. One or more holes are particularly preferred since these allow a connection of second, moulded material to extend from the rearward face to the forward face of the end hook. This connection ensures that either the moulded material or the support portion must tear or fracture in order to break the mechanical connection between the support portion and the grip portion.

Preferably, the support portion includes a plurality of concave formations (e.g. channels or holes) distributed in the support portion. Seven such formations are particularly preferred, since these can provide a suitable mechanical linkage between the support portion and the grip portion.

Additionally or alternatively, the support portion may include a dovetail shape which can cooperate with a corresponding shape in the moulded grip material.

The end hook or the support portion may include one or more surfaces (e.g. one surface on the rearward face and one surface on the forward face) which are not covered by the second material. The grip portion may be formed around such surfaces. At the interface between the surface of the grip portion and the non-covered part of the end hook, the surfaces may be substantially continuous and preferably substantially flat. In this way, the forward and rearward surfaces of the end hook may be substantially flat. This allows more accurate measurement of distances from a surface using the measure.

Preferably, the grip portion is formed so that it embraces the end surface or edge of the support portion. The end surface of the support portion is the surface of the support portion (before moulding of the grip portion) which is disposed furthest from the remainder of the end piece. After moulding of the grip portion, therefore, the surface of the end hook which is disposed furthest from the remainder of the end piece is a surface of the grip portion.

Preferably, the support portion is formed from a relatively rigid material. For example, the support portion may be moulded from a nylon material such as glass reinforced nylon. Preferably, this material is impact modified. Such a material combines suitable properties of rigidity, dimensional stability and toughness. Alternatively, the support portion may be formed from another plastics material such as Ixef or carbon fibre reinforced acetal. Alternatively, the support portion may be formed of a metallic material, such as steel (preferably stainless steel).

Preferably, the grip portion is formed of a relatively resilient material, for example one with a relatively high friction coefficient. Rubber or rubber-like material is suitable. For example, a polyurethane material (TPU) is particularly preferred. Alternatively, a thermoplastic elastomer (TPE) may be used.

An advantage of using the preferred first and second materials is that moulding the second material onto the first tends to give a relatively strong bond at the interface between them, particularly if one or both materials have been chemically modified to increase the bond strength between them.

In a third aspect, the present invention provides a method of forming a measuring tape end piece, e.g. according to the first aspect, the method including the steps of:

providing a support portion of an end hook, the support portion being formed of a first material and having a keying surface; and moulding a grip portion, formed of a second material, onto the keying surface, thereby to secure the grip portion to the support portion.

The third aspect may include any of the preferred features according to the first or second aspect, for example as steps of forming those preferred features.

Preferably, the support portion is formed in a first moulding step. The grip portion is then formed in a second moulding step. The second moulding step may be performed in an overmould tool. However, preferably, both moulding steps are performed in the same tool, for example sequentially, using a twin shot tool.

In the case where the support portion is not formed by moulding, for example where the support portion is formed of a metallic material such as steel (e.g. stainless steel), the grip portion may be formed by a moulding step, e.g. in an insert moulding operation. The keying interface may be formed in the support portion by any suitable forming process such as forging, stamping, machining etc. This method constitutes a fourth, independent aspect of the invention.

Embodiments of the present invention will now be described, by way of example only, with reference to the accompanying drawings, in which.

In the following, similar reference numerals are used for similar features shown in different drawings.

Figure 1:
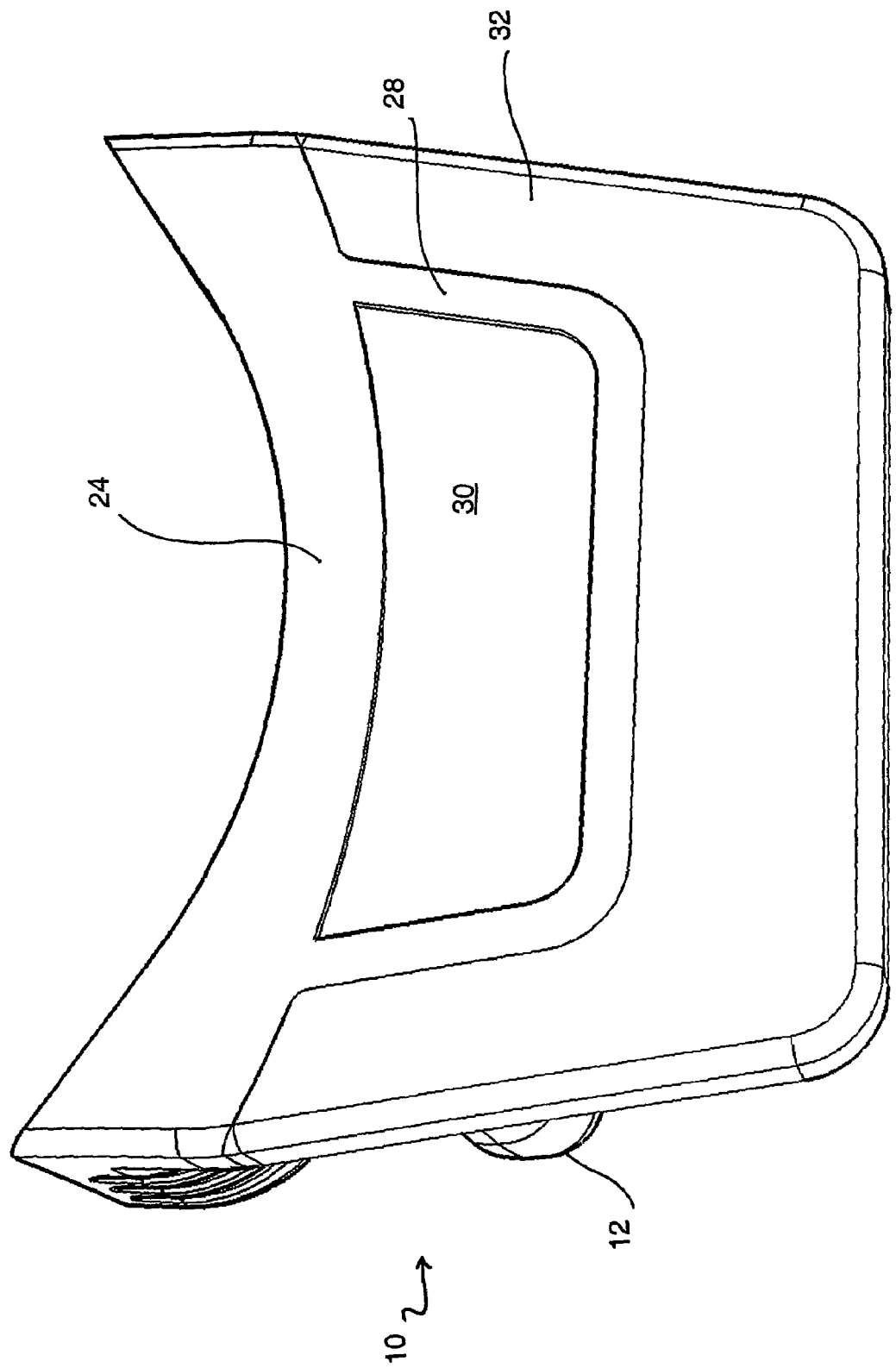
FIG. 1 shows a schematic front perspective view of an end piece according to an embodiment of the invention.
Figure 2:
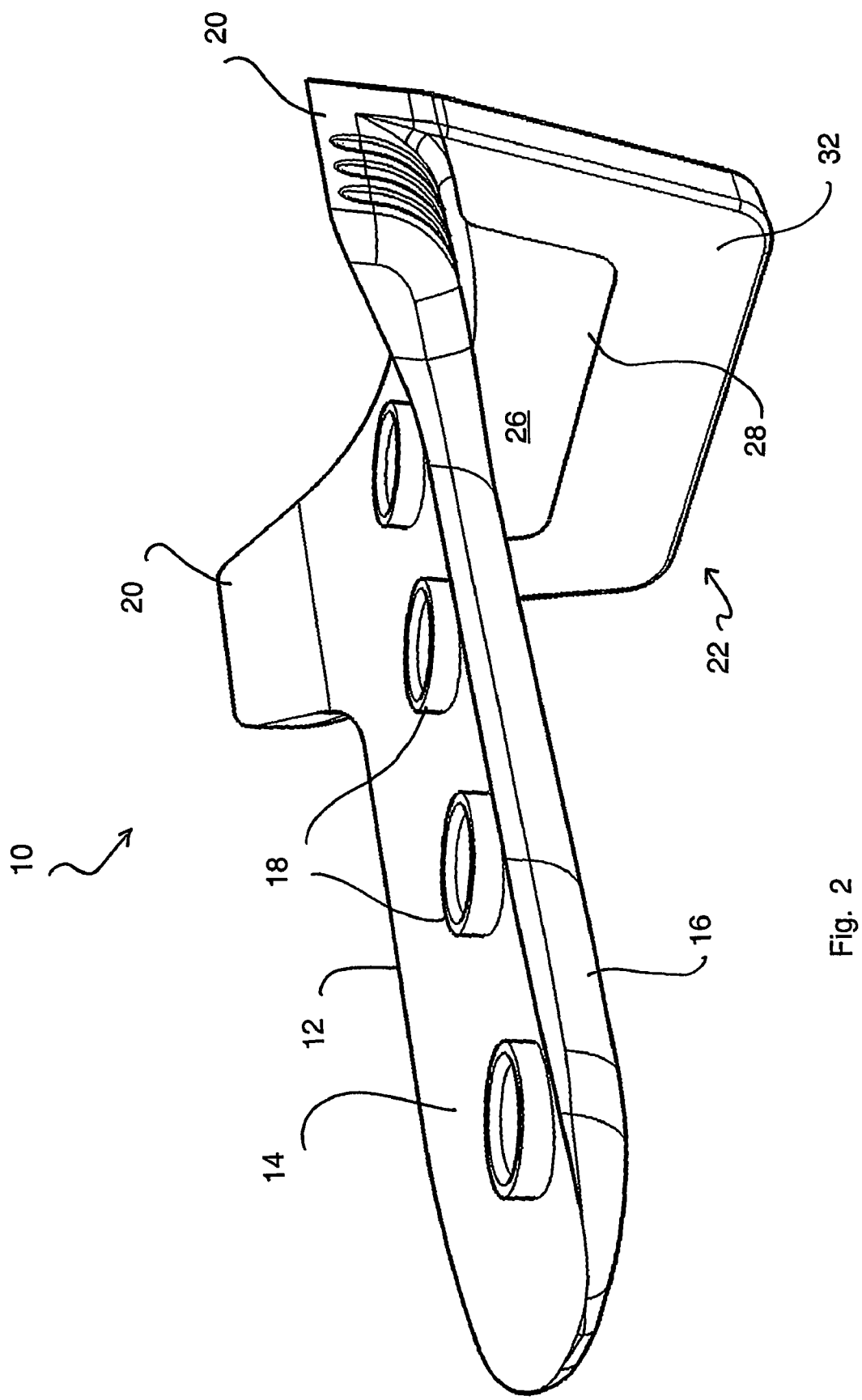
FIG. 2 shows a schematic rear and side perspective view of the end piece shown in FIG. 1.

In FIGS. 1 and 2, an end piece 10 is shown. This has a longitudinally extending connection portion 12 with a concavely curved upper surface 14 and a convexly curved lower surface 16. Upper surface 14 has generally cylindrical projections 18 with holes extending through the depth of connection portion 12. In use, a measuring blade sits on the surface 14 and is connected to the end piece by rivets or similar connection means through the holes in projections 18.

Connection portions 12 flare out in width at side walls 20. An end hook 22 projects approximately at right angles to connection portion 12 at the forward extremity of the end piece 10. The directions forward and rearward are in relation to the measuring tape to which the end piece is to be attached. The forward direction is the longitudinal direction of the measuring tape in which the printed measurement graduations decrease in magnitude. The rearward direction is the opposite direction, i.e. the direction in which the numbers on the measuring blade increase.

End hook 22 has a forward face 24 and a rearward face 26. The end hook has a support portion 28 which is shown in the drawings as having a slightly depressed region 30, although this is not essential to the operation of the end hook. Mounted on the support portion 28 is a grip portion 32. Grip portion 32 is formed by moulding. It embraces the edge (not shown in FIGS. 1 and 2) of supporting portion 28.

The connection portion and support portion are formed integrally by moulding glass reinforced nylon which has been impact modified. The grip portion is nylon bondable thermoplastic elastomer or alternatively the grip portion is TPU or another rubber-like material.

The material of the connection portion and the support portion is glass reinforced nylon which has further been modified so that it preferentially forms a chemical bond with, in this case, TPU. Such materials are known and are generally referred to as TPU-bondable nylons. The same can be said of TPU-bondable ABS (another readily-available plastics material for use for moulding the support portion). In the case where the support portion material is modified so that it bonds well to the grip portion material, the grip portion material should not itself be modified to be bondable to the material of the support portion. Such combinations of materials tend not to bond well together. Therefore, another embodiment uses a standard nylon (glass reinforced) or ABS for the material of the support portion and uses nylon-bondable (or ABS-bondable, as appropriate) TPU material for the grip portion. Such TPU material is known and is readily available. In a further embodiment, the same material is used for the support portion as in any of the above embodiments but nylon-bondable (or ABS-bondable, as appropriate) TPE material is used for the grip portion.

Figure 3:
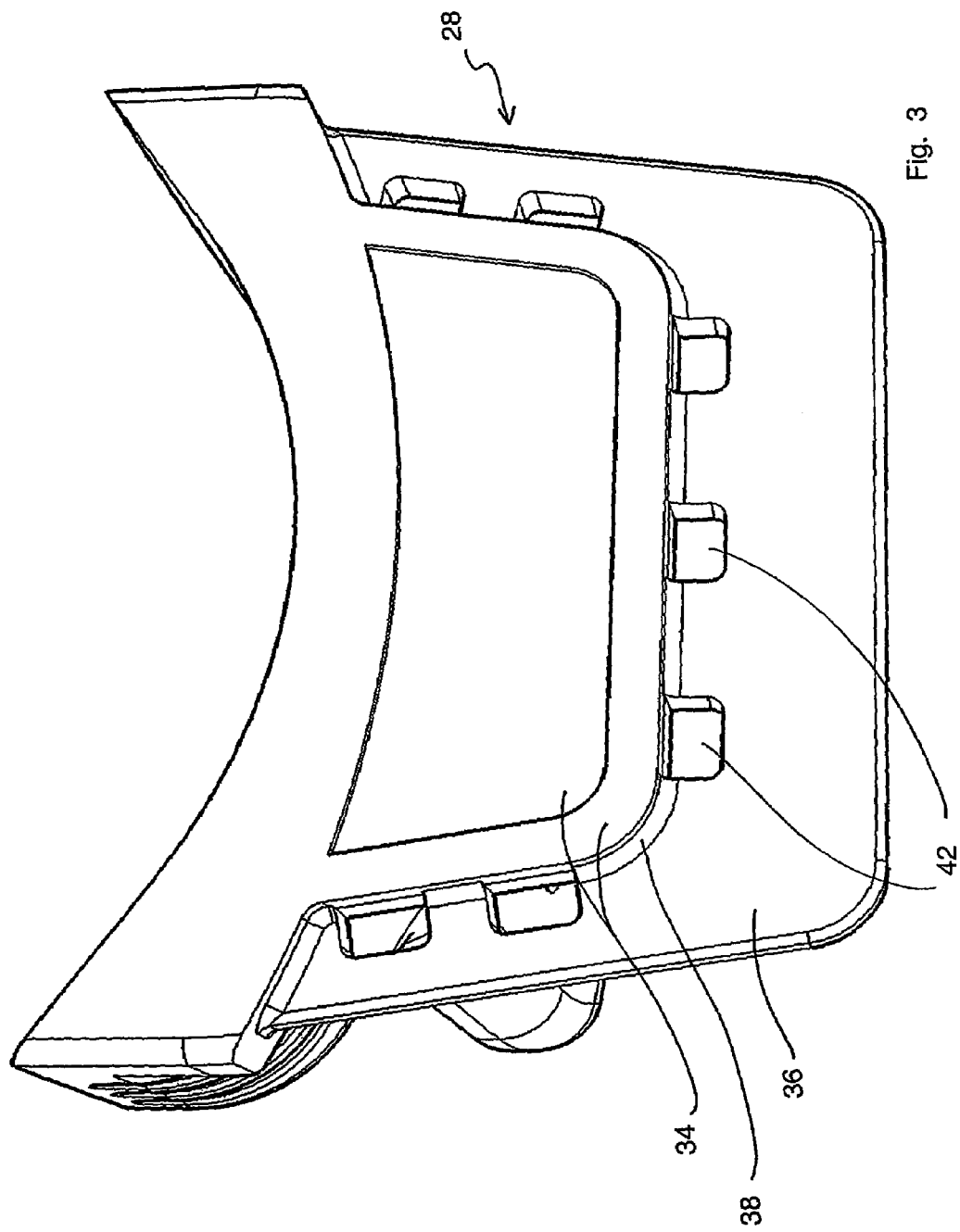
FIG. 3 shows a similar view to that of FIG. 1, but without the grip portion.
Figure 4:
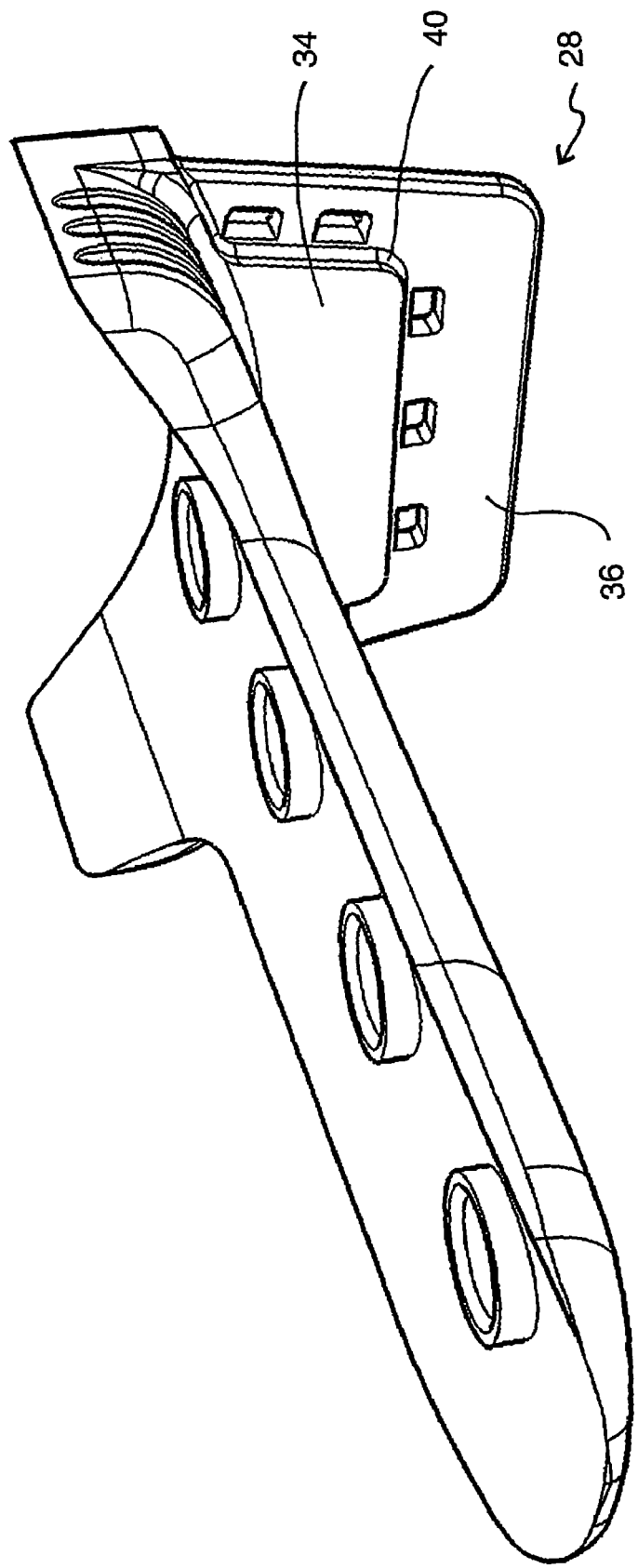
FIG. 4 shows a similar view to that shown in FIG. 2, but without the grip portion.

FIGS. 3 and 4 show the end piece without the grip portion. This is the shape which is moulded from glass reinforced nylon. These drawings show the whole of the support portion 28, because the grip portion is not shown. The support portion 28 includes a relatively thick central part 34. From the lateral surface (i.e. the surface connecting the forward and rearward faces) of the thick central portion 34 extends a relatively thin tongue 36. Tongue 36 extends in substantially the same direction as the remainder of the end hook, i.e. substantially perpendicular to the connection portion 12. Due to the difference in thickness between tongue portion 36 and thick central portion 34, a concave step 38 is formed between tongue 36 and central portion 34. A complimentary step 40 is formed on the rearward face (shown in FIG. 4).

Holes 42 are formed in tongue portion 36. These extend in the longitudinal direction of the end piece from the forward face to the rearward face of the support portion. In the drawings, three holes 42 are formed in the base part of the tongue portion 36 and two holes 42 are formed in each lateral part of the tongue portion 36, making up seven holes 42 in all. The function of the holes is described in more detail below.

Figure 5:
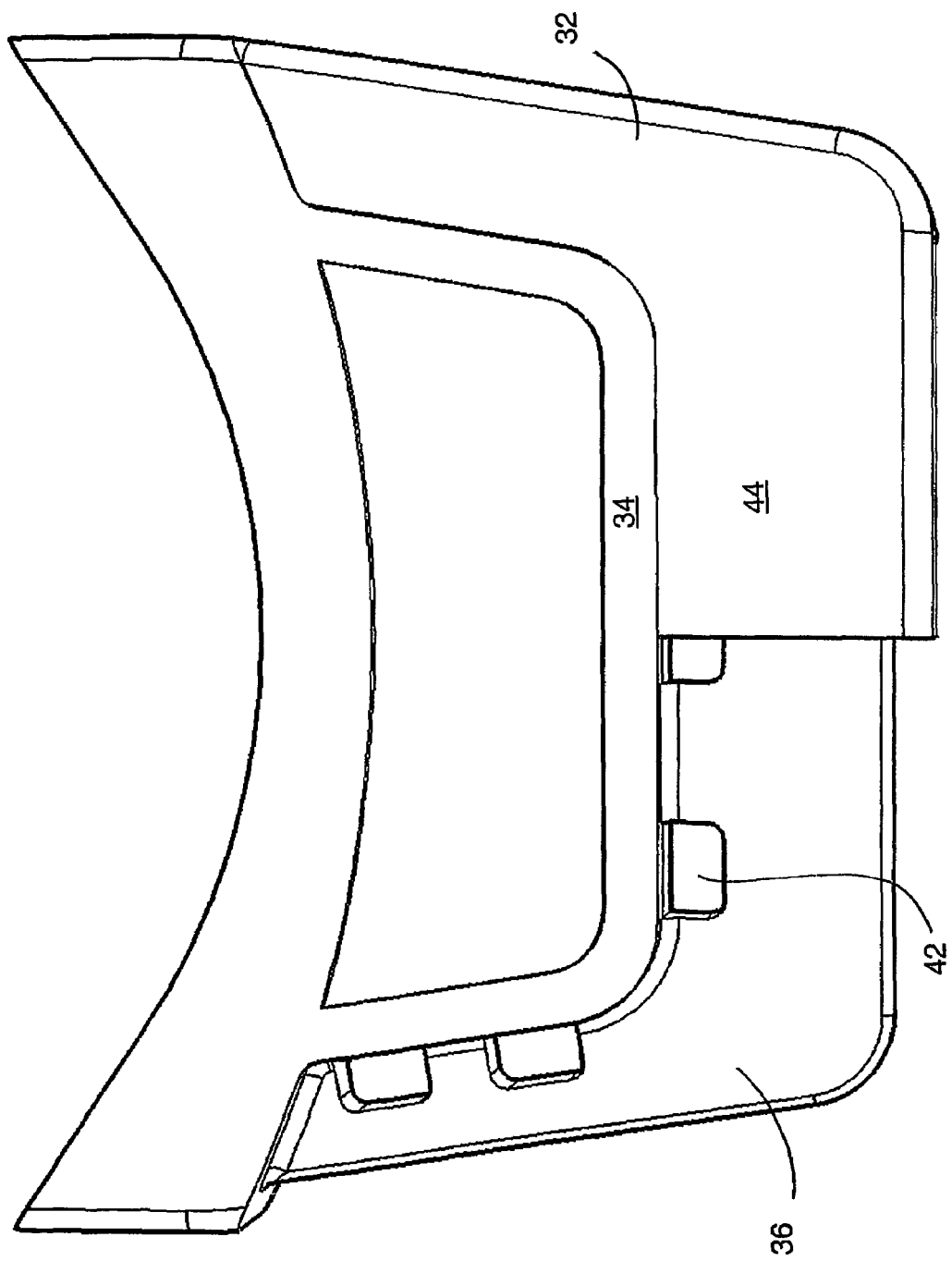
FIG. 5 shows a front view of the embodiment shown in FIG. 1, but with half of the grip portion cut away.
Figure 6:
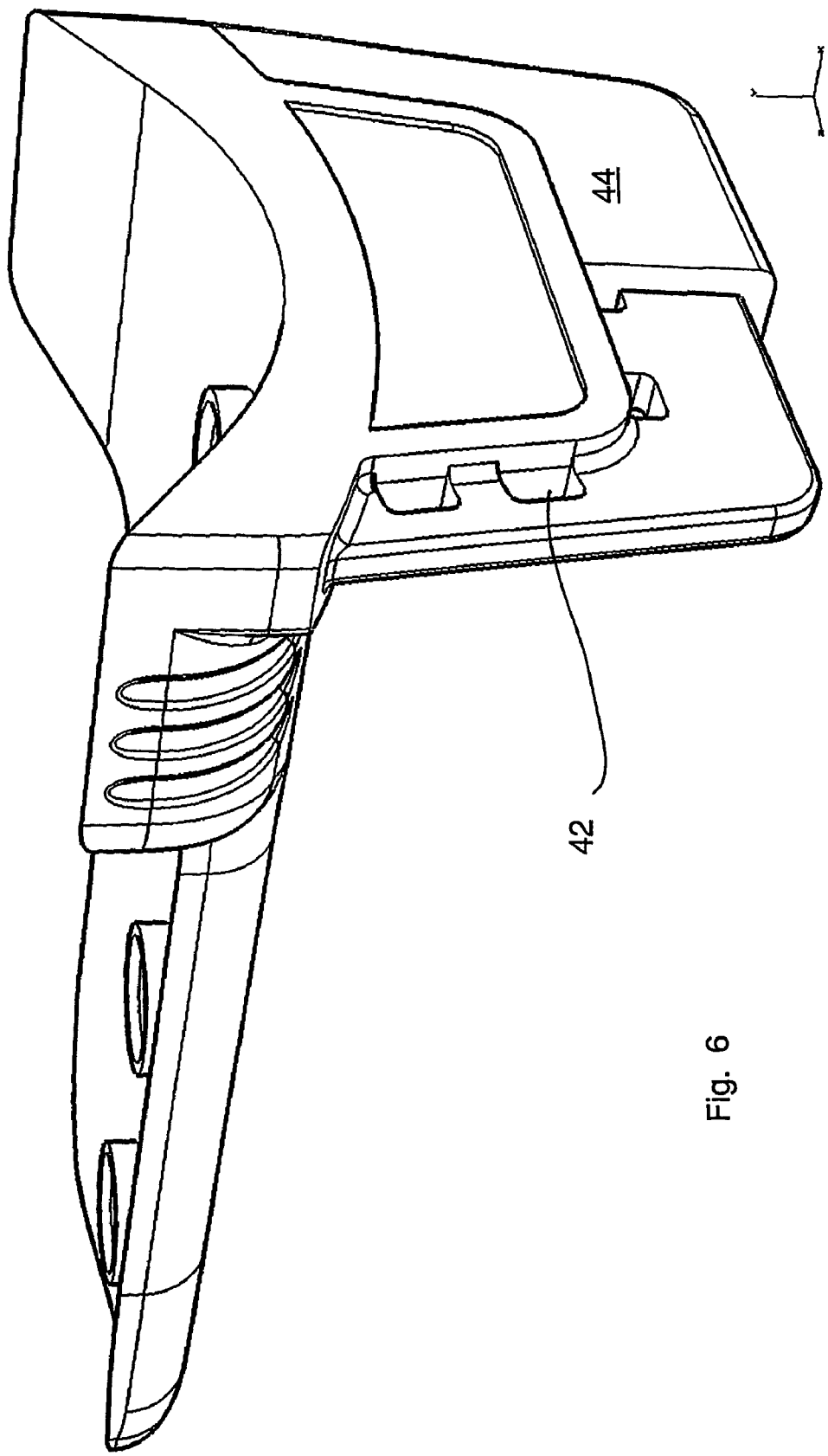
FIG. 6 shows the end piece of FIG. 5 in a front and side perspective view.
Figure 7:
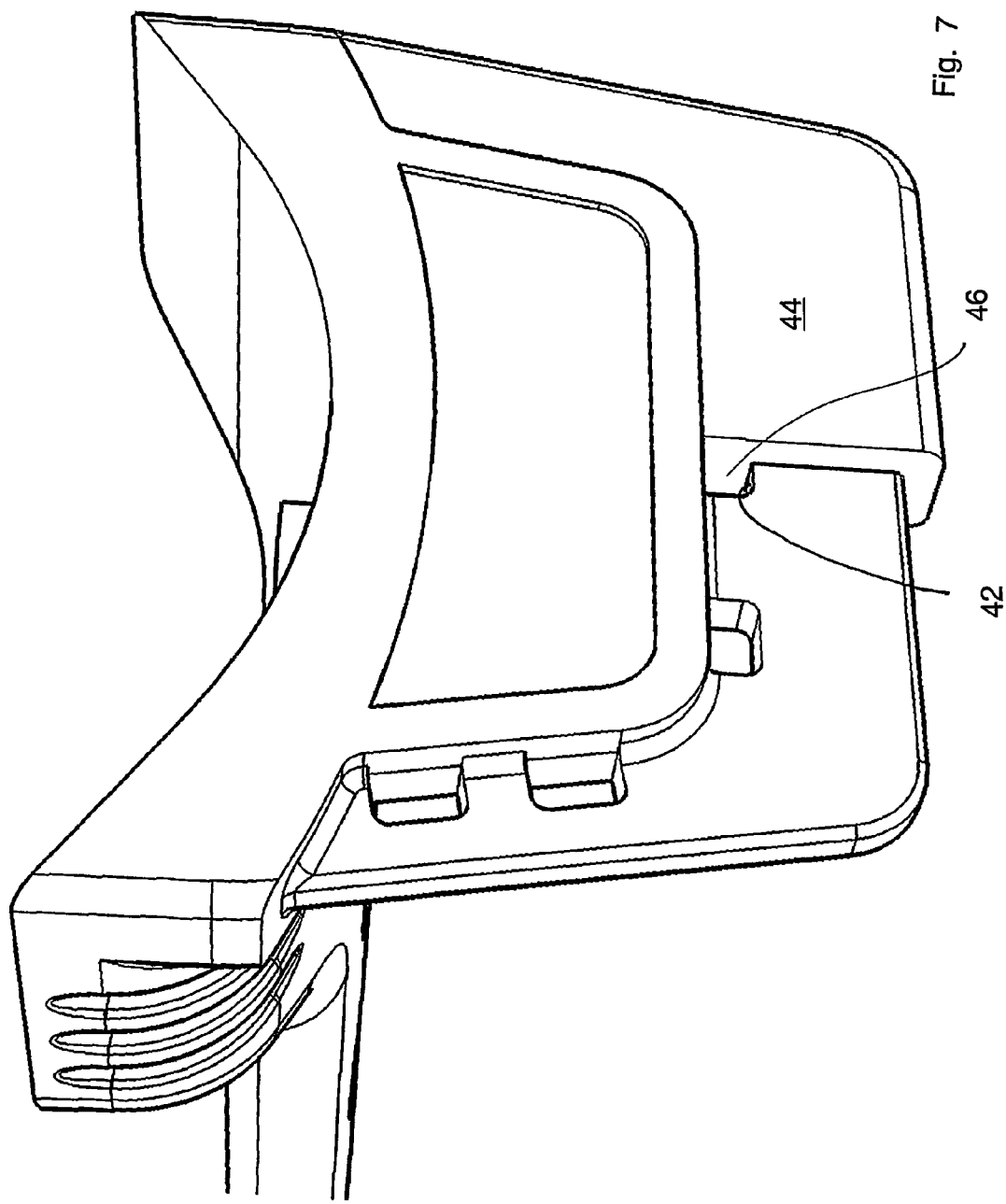
FIG. 7 shows an enlarged view of the end hook part of the end piece of FIG. 6.

FIGS. 5, 6 and 7 show the end piece with part of the grip portion 32 cut away. Grip portion 32 is of similar thickness to thick central part 34 of support portion 28. Surface 44 lies flush and parallel to adjacent surface 34. In this way, the forward and rearward faces of the end hook are made substantially flat.

Grip portion 32 embraces the edge of tongue portion 36. In this way, the lower surface of the end hook is formed from the grip portion. In other words, the grip portion 32 extends further from central part 34 than does tongue portion 36 of the grip portion. Since the grip portion is moulded to lie flush with thick central part 34, concave steps 38 and 40 are filled by the grip portion. This cooperating shape provides a mechanical key which allows the grip portion 34 to be firmly bonded to support portion 28. The grip portion also bonds to surface 36, e.g. by a chemical bond.

Parts of the grip portion also extend through holes 42, as shown well in FIGS. 6 and 7. In particular, FIG. 7 shows a mechanical linking portion 46 extending through a hole 42. The grip portion is formed in one piece by moulding. The support portion is also formed in one piece by moulding. Therefore, with mechanical links 46 holding the grip portion with respect to the support portion, the only way in which the grip portion may be mechanically separated from the support portion is by one or both of the support portion and the grip portion fracturing or tearing. This feature, combined with the strong bond between the TPU or thermoplastic elastomer (TPE) of the grip portion and the glass reinforced nylon material (impact modified) of the support portion makes the grip portion particularly difficult to dislodge from the support portion. For this reason, the grip portion is unlikely to break away from the support portion during use of the tape measure.

Figure 8:
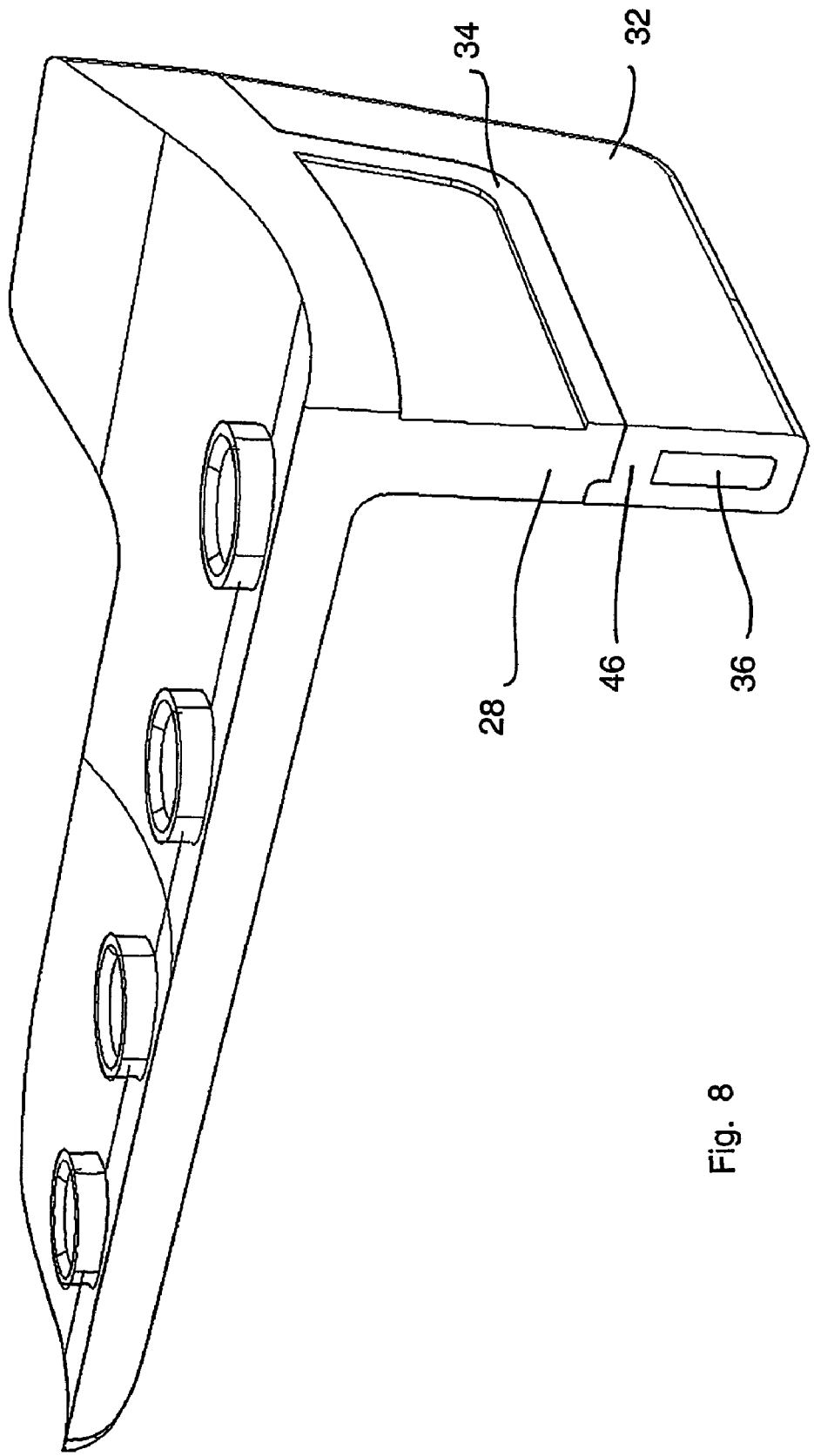
FIG. 8 shows a schematic longitudinal sectional view of the end piece shown in FIG. 1, from a front and side perspective.

FIG. 8 shows a schematic longitudinal cross-section of the end piece. This drawing shows the mechanical link 46 extending from the forward to the rearward face of the grip portion. This drawing also shows part of the tongue portion 36 below one of the holes 42. It is clearly shown here that the material of the grip portion 32 surrounds and encapsulates part of support portion 28.

The end piece may be made by injection moulding. In particular, the glass reinforced nylon of the connection portion 12 and support portion 28 may be injected in a tool (not shown) in a first injection step. Subsequently, the TPU or TPE material of the grip portion is injected into the second tool in a second injection step. Accordingly, the end piece is formed via "two shot" moulding.

The preferred embodiments have been described by way of example only. Modifications of these embodiments, further embodiments and modifications thereof will be apparent to those skilled in the art and as such are within the scope of the invention.

The invention claimed is:

1. An end piece for attachment to a free end of a measuring tape, the end piece comprising an end hook with a support portion formed of a first material and a grip portion formed of a second material, wherein the grip portion embraces an end surface or edge of the support portion and the support portion provides a keying interface on which the grip portion is moulded, thereby securing the grip portion to the support portion, and wherein the keying interface comprises at least one concave formation on the support portion.

2. The end piece according to claim 1 wherein the at least one concave formation comprises a concave step or steps, dent or dimple.

3. The end piece according to claim 1 wherein the at least one concave formation is located at least on the rearward side of the support portion.

4. The end piece according to claim 1 wherein the support portion comprises a surface on at least one of the rearward face and the forward face of the end hook which are not covered by the second material, the grip portion being disposed adjacent said surface or surfaces.

5. The end piece according to claim 1 wherein the grip portion is formed of a more resilient material than to the first material.

6. A measuring tape with a free end and the end piece according to claim 1 attached to the free end.

7. A method of forming a the measuring tape end piece according to claim 1 the method comprising: providing a support portion of an end hook, the support portion being formed of a first material and having a keying surface; and moulding a grip portion, formed of a second material, onto the keying surface, thereby to secure the grip portion to the support portion, the grip portion embracing an end surface or edge of the support portion.

8. The method according to claim 7 wherein the support portion is formed in a first moulding step and the grip portion is then formed in a second moulding step.

9. The end piece according to claim 1 further comprising a connection portion, wherein the end hook projects at approximately a right angle from the connection portion.

10. A measuring tape comprising:
a measuring blade comprising a free end; and
the end piece according to claim 1 fixedly attached to the free end of the measuring blade.

11. An end piece for attachment to a free end of a measuring tape, the end piece comprising an end hook with a support portion formed of a first material and a grip portion formed of a second material, wherein the grip portion embraces an end surface or edge of the support portion and the support portion provides a keying interface on which the grip portion is moulded, thereby securing the grip portion to the support portion, and
wherein the keying interface comprises at least one channel formed in the support portion.

12. The end piece according to claim 11 wherein the channel is a hole extending from the rearward side to the forward side of the support portion.

13. An end piece for attachment to a free end of a measuring tape, the end piece comprising an end hook with a support portion formed of a first material and a grip portion formed of a second material, wherein the grip portion embraces an end surface or edge of the support portion and the support portion provides a keying interface on which the grip portion is moulded, thereby securing the grip portion to the support portion, and
wherein the end hook comprises a forward face and a rearward face, at least a portion of the forward and rearward faces formed from the first material, and at least a portion of the forward and rearward faces formed from the second material.

14. The end piece according to claim 13, wherein the forward and rearward faces of the end hook are substantially flat.

* * * * *